(12) United States Patent
Kang et al.

(10) Patent No.: US 9,602,506 B2
(45) Date of Patent: Mar. 21, 2017

(54) METHOD AND APPARATUS FOR SUPPORTING LOGIN THROUGH USER TERMINAL

(71) Applicants: Samsung Electronics Co., Ltd., Suwon-si, Gyeonggi-do (KR); RESEARCH & BUSINESS FOUNDATION SUNGKYUNKWAN UNIVERSITY, Suwon-si, Gyeonggi-do (KR)

(72) Inventors: Bo-Gyeong Kang, Seoul (KR); Hyoung-Shick Kim, Suwon-si (KR); Young-Bae Song, Suwon-si (KR); Jin-A Kang, Suwon-si (KR); Jung-Je Son, Yongin-si (KR); DucKey Lee, Seoul (KR)

(73) Assignees: Samsung Electronics Co., Ltd., Suwon-si (KR); Research & Business Foundation Sungkyunkwan Univeresity, Suwon-si (KR)

( * ) Notice: Subject to any disclaimer, the term of this patent is extended or adjusted under 35 U.S.C. 154(b) by 12 days.

(21) Appl. No.: 14/667,984

(22) Filed: Mar. 25, 2015

(65) Prior Publication Data
US 2015/0281229 A1 Oct. 1, 2015

(30) Foreign Application Priority Data
Mar. 25, 2014 (KR) ........................ 10-2014-0034714

(51) Int. Cl.
*H04L 29/06* (2006.01)
*G06F 21/34* (2013.01)
(Continued)

(52) U.S. Cl.
CPC .......... *H04L 63/0853* (2013.01); *G06F 21/34* (2013.01); *G06F 21/35* (2013.01);
(Continued)

(58) Field of Classification Search
CPC . H04L 63/0853; H04L 63/0815; H04L 63/18; H04L 63/083; H04L 67/02;
(Continued)

(56) References Cited

U.S. PATENT DOCUMENTS 8,256,664 B1 * 9/2012 Balfanz .................. H04L 63/08
235/375
8,307,413 B2 * 11/2012 Smadja ................... G06F 21/34
713/172

(Continued)

FOREIGN PATENT DOCUMENTS

WO 2014/010784 A1 1/2014

OTHER PUBLICATIONS

Blasko, Gabor, Chandra Narayanaswami, and Mandayam Raghunath. A wristwatch-computer based password-vault. Technical report, IBM Research Division, 2005.*

(Continued)

*Primary Examiner* — Michael Simitoski
(74) *Attorney, Agent, or Firm* — Jefferson IP Law, LLP (57) ABSTRACT

A method of supporting a login for a web service of a user terminal using a portable device is provided. The method includes registering the portable device through a wireless communication with the portable device, encrypting login information for at least one web service and transmitting the login information to the registered portable device, and transmitting a request message requesting a transmission of the login information of the web service to the portable device. The request message includes a service identification (ID) identifying the web service.

22 Claims, 7 Drawing Sheets

(51) Int. Cl.
| | | |
|---|---|---|
| *H04L 9/32* | (2006.01) | |
| *G06F 21/45* | (2013.01) | |
| *G06F 21/35* | (2013.01) | |
| *H04L 29/08* | (2006.01) | |
| *H04W 12/06* | (2009.01) | |
| *H04W 4/00* | (2009.01) | |
| *G06F 21/00* | (2013.01) | |

(52) U.S. Cl.
CPC .......... *G06F 21/45* (2013.01); *H04L 63/0815* (2013.01); *H04L 63/0869* (2013.01); *H04L 63/18* (2013.01); *H04L 67/02* (2013.01); *H04W 4/008* (2013.01); *H04W 12/06* (2013.01)

(58) Field of Classification Search
CPC .......... G06F 21/34; G06F 21/35; G06F 21/41; H04W 12/06; H04W 4/008
See application file for complete search history.

(56) References Cited

U.S. PATENT DOCUMENTS

| | | | | |
|---|---|---|---|---|
| 8,443,425 | B1* | 5/2013 | Evans | G06F 21/31 726/26 |
| 8,661,540 | B2* | 2/2014 | Hamid | G06F 21/31 709/204 |
| 8,689,308 | B2* | 4/2014 | Zhang | G06F 21/32 455/557 |
| 8,856,902 | B2* | 10/2014 | Payne | G06F 21/35 726/3 |
| 8,914,855 | B2* | 12/2014 | Whitmyer, Jr. | G06F 21/34 726/5 |
| 8,959,583 | B2* | 2/2015 | Fadida | H04L 63/083 726/2 |
| 9,032,495 | B2* | 5/2015 | Zhang | H04L 63/083 726/7 |
| 9,131,370 | B2* | 9/2015 | Schrecker | H04B 5/0006 |
| 9,208,304 | B2* | 12/2015 | Hong | H04L 63/0807 |
| 2001/0045454 | A1* | 11/2001 | Gangi | G06K 7/0004 235/380 |
| 2004/0193925 | A1* | 9/2004 | Safriel | H04L 63/083 726/6 |
| 2008/0092211 | A1 | 4/2008 | Klemets et al. | |
| 2009/0217056 | A1* | 8/2009 | Malpani | G06F 21/34 713/193 |
| 2009/0328169 | A1* | 12/2009 | Hutchison | G06F 21/41 726/7 |
| 2010/0070759 | A1* | 3/2010 | Leon Cobos | G06F 21/43 713/155 |
| 2010/0169962 | A1* | 7/2010 | Lu | G06F 21/34 726/9 |
| 2011/0219427 | A1* | 9/2011 | Hito | G06F 21/00 726/3 |
| 2011/0252235 | A1 | 10/2011 | Dolan et al. | |
| 2012/0324556 | A1* | 12/2012 | Yefimov | H04W 12/06 726/7 |
| 2013/0041997 | A1 | 2/2013 | Li et al. | |
| 2013/0046983 | A1 | 2/2013 | Zhu et al. | |
| 2013/0146659 | A1 | 6/2013 | Zhou et al. | |
| 2013/0167208 | A1* | 6/2013 | Shi | H04L 63/18 726/5 |
| 2013/0173915 | A1* | 7/2013 | Haulund | H04L 9/3226 713/159 |
| 2013/0268767 | A1* | 10/2013 | Schrecker | G06F 21/31 713/185 |
| 2014/0033286 | A1* | 1/2014 | Zhang | H04L 63/083 726/7 |
| 2014/0189808 | A1* | 7/2014 | Mahaffey | H04L 63/0853 726/4 |
| 2014/0223175 | A1* | 8/2014 | Bhatnagar | G09C 5/00 713/159 |
| 2014/0298432 | A1* | 10/2014 | Brown | H04L 63/083 726/6 |
| 2014/0317708 | A1* | 10/2014 | Adrangi | H04B 5/00 726/7 |
| 2014/0380445 | A1* | 12/2014 | Tunnell | G06F 21/00 726/7 |
| 2015/0201022 | A1 | 7/2015 | Kim et al. | |
| 2015/0215312 | A1* | 7/2015 | Cesnik | H04L 9/3271 726/9 |

OTHER PUBLICATIONS

Han, Weili, Ye Cao, and Chang Lei. "Using a smart phone to strengthen password-based authentication." Internet of Things (iThings/CPSCom), 2011 International Conference on and 4th International Conference on Cyber, Physical and Social Computing. IEEE, 2011.*

McCarney, Daniel, et al. "Tapas: design, implementation, and usability evaluation of a password manager." Proceedings of the 28th Annual Computer Security Applications Conference. ACM, 2012.*

Stajano; Pico: No more passwords!; University of Cambridge Computer Laboratory; In Proc. Security Protocols Workshop 2011; Aug. 31, 2011; Springer LNCS; Cambridge, UK.

Bonneau; The Quest to Replace Passwords: A Framework for Comparative Evaluation of Web Authentication Schemes; University of Cambridge; 2013; Cambridge, UK.

* cited by examiner

METHOD AND APPARATUS FOR SUPPORTING LOGIN THROUGH USER TERMINAL

CROSS-REFERENCE TO RELATED APPLICATION(S)

This application claims the benefit under 35 U.S.C. §119(a) of a Korean patent application filed on Mar. 25, 2014 in the Korean Intellectual Property Office and assigned Serial No. 10-2014-0034714, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) Samsung Electronics Co., Ltd., and 2) Research & Business Foundation Sungkyunkwan University.

TECHNICAL FIELD

The present disclosure relates to a sensor network, Machine Type Communication (MTC), Machine-to-Machine (M2M) communication, and technology for Internet of Things (IoT). The present disclosure may be applied to intelligent services based on the above technologies, such as smart home, smart building, smart city, smart car, connected car, health care, digital education, smart retail, security and safety services. The present disclosure relates to a method and apparatus for supporting a login. More particularly, the present disclosure relates to a method and apparatus which securely manages login information for a user's authentication of a web service, an application, or the like, and increases a user's convenience.

BACKGROUND

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

A user terminal that is capable of executing various web services or applications using the Internet is a popular electronic device and its use has increased over the years. For example, a user may access a web service and execute an application through a user terminal such as a smart television (TV), a Personal Computer (PC), a smart phone, a tablet, a notepad, etc.

In order for a user to access a web service, an application, or the like through a user terminal, usually an input of login information, such as a user identification (ID), a password, or the like, is requested. However, it is inconvenient for a user to directly manage and input pieces of login information for a plurality of web services or applications.

In order to address such an inconvenience, a login method in which a password manager loadable in a user terminal is used, a cloud based password manager login method in which a password manager installed in a random server accessible the user terminal through Internet and the like is used, or the like is utilized.

The password manager stores login information input by a user and inputs the login information corresponding to a login information input request of a web service or an application instead of the user. The password manager is a module that increases the convenience of a user in a case of a login.

However, since a password manager loaded on a specific user terminal may only be used in that user terminal, in order for the user to log in using the password manager in another user terminal, the password manager should be installed in the other user terminal and the login information should be input to the other user terminal, Thus, the user is again inconvenienced.

The cloud based password manager login method is a method in which a user stores login information in a separate device (e.g., an external server) which is not managed by the user, and which provides the login information of the user to a web service when there is a web service requesting the login information. That is, the cloud based password manager login method requests the user to store personal information (e.g., the login information) in the separate device. In order to check and withdraw the login information stored in a cloud server, at least one master key should be used. Since the master key may be leaked due to an attack, such as a dictionary attack (i.e., an attack solving a password or an authentication by attempting lots of possible passwords using words and the like in a dictionary) or an attack using a rainbow table (i.e., a previously calculated table which is used for solving a password hash function), the master key is weak in its security. Therefore, the master key is being ignored by a user.

Thus, the existing password managing method cannot overcome disadvantages such as user inconvenience and weakness in the security, and the existing password managing method is not easily used.

Furthermore, since a wearable and portable device (e.g., a portable device) is being actively used these days, a method of using the portable device is being considered.

The above information is presented as background information only to assist with an understanding of the present disclosure. No determination has been made, and no assertion is made, as to whether any of the above might be applicable as prior art with regard to the present disclosure

SUMMARY

Aspects of the present disclosure are to address at least the above-mentioned problems and/or disadvantages and to provide at least the advantages described below. Accordingly, an aspect of the present disclosure is to provide a method and apparatus capable of login of a web service or an application through a plurality of user terminals using one device.

Another aspect of the present disclosure is to provide a method and apparatus for supporting a login which can enable a user to log in through a plurality of user terminals without storing personal information in an external device which is not managed by the user, and can resolve a weakness in security that occurs when the personal information is stored in the external device.

In accordance with an aspect of the present disclosure, a method of supporting a login for a web service of a user terminal using a portable device is provided. The method includes registering the portable device through a wireless communication with the portable device, encrypting login information for at least one web service and transmitting the login information to the registered portable device, and transmitting a request message requesting a transmission of the login information of the web service to the portable device. The request message includes a service identification (ID) identifying the web service.

In accordance with another aspect of the present disclosure, a method of supporting a login of a portable device which supports a web service login of a user terminal is provided. The method includes registering the portable device to the user terminal through a wireless communication with the user terminal, receiving login information for at least one web service from the user terminal and storing the login information, receiving a request message requesting a transmission of the login information of the web service from the user terminal, and transmitting the login information of the web service in response to the request message. The request message includes a service ID identifying the web service.

In accordance with another aspect of the present disclosure, a user terminal for supporting a login for a web service using a portable device is provided. The user terminal includes a login manager configured to register the portable device through a wireless communication with the portable device, to encrypt login information for at least one web service, to transmit the login information to the registered portable device, and to transmit a request message requesting a transmission of the login information of the web service to the portable device. The request message includes a service ID identifying the web service.

In accordance with another aspect of the present disclosure, a portable device for supporting a login for a web service of a user terminal is provided. The device includes a password manager that registers the portable device to the user terminal through a wireless communication with the user terminal, receives login information for at least one web service from the user terminal, stores the login information in a storage unit, receives a request message requesting a transmission of the login information of the web service from the user terminal, and transmits the login information of the web service in response to the request message; and the storage unit that stores the login information received from the user terminal. The request message includes a service ID identifying the web service.

In accordance with various embodiments of the present disclosure, a user can conveniently log in to a web service or an application through a portable device even when the user uses various pieces of login information (e.g., a user ID, a password and the like) in order to access the web service or the application in a plurality of user terminals.

In accordance with various embodiments of the present invention, pieces of user login information, such as a plurality of passwords and user IDs, are managed in a user portable device, specifically, a wearable device such as a watch, glasses, an arm band, etc., which can communicate with a user terminal and provide a display to the user. Therefore, the login information can be stored in a physically secure space where there is a low probability of hacking, and the login information can be discarded as occasion demands.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Prior to a description of the present disclosure, examples of meanings and replaceable terms for several terms used in the present disclosure are proposed. However, it should be understood that the terms are not to be interpreted as limiting examples.

A user terminal refers to any type of terminal device capable of driving a browser, an application, or the like that may access a web service by a user. For example, the user terminal may include a smart television (TV) connected to an Internet network, a personal computer (PC), or a laptop computer connected to the Internet through a wired or wireless local area network (LAN), a smart phone, a notepad, or a Personal Digital Assistant (PDA) connected to the Internet through a cellular network, a wireless local area network (WLAN), and the like.

A portable device is a device which can communicate with a user terminal and has independent calculation and storage functions. For example, a portable device may be implemented as a wearable device such as a watch, glasses, an arm band, etc., and a device such as a smart phone, a notepad, and the like may be employed as the portable device. Selectively, the portable device may further include a display unit which can provide a display to a user. The portable device may be referred as a wearable device and a Second Smart Device (SSD).

A login manager is a function unit (e.g., a module) installed in a user terminal, and may be installed in a plug-in form in a web browser which is installed in the user terminal. The login manager may transmit at least one piece of login information (e.g., a user identification (ID), a password, etc.) to the portable device, request a transmission of the login information to the portable device as needed, receive the login information, and input (e.g., insert) the login information to a web browser. The login manager may be referred to an auto-login manager, a login controller, an auto-login controller, and the like. The login manager may be downloaded and installed from an external server through an Internet connection as occasion demands, may be loaded on the user terminal by a manufacturer, and the like.

A password manager is a function unit (e.g., a module) installed in a portable device. The password manager controls to receive login information from a user terminal, to store the login information, and to extract and return the login information according to a request of the user terminal. The password manager may be installed in the portable device by a manufacturer, may be downloaded and installed from an external server through an external network, and the like.

Login information is information necessary to log in to a specific web service, and may include a user ID, a password, and the like. Selectively, the login information may further include at least one of a service ID, a session ID, login uniform resource locator (URL) information, and the like.

A web service refers to any type of service provided through an Internet communication. However, the web service does not only refer to a service of a web form. That is, the web service may refer to any service provided from an external server to a user through a user terminal. Thus, in the present disclosure, a service provided from a smart phone or a smart pad through a separate application may be referred to as a web service. In addition, in the present disclosure, any type of server providing a web service is referred to as a web server.

Figure 1:
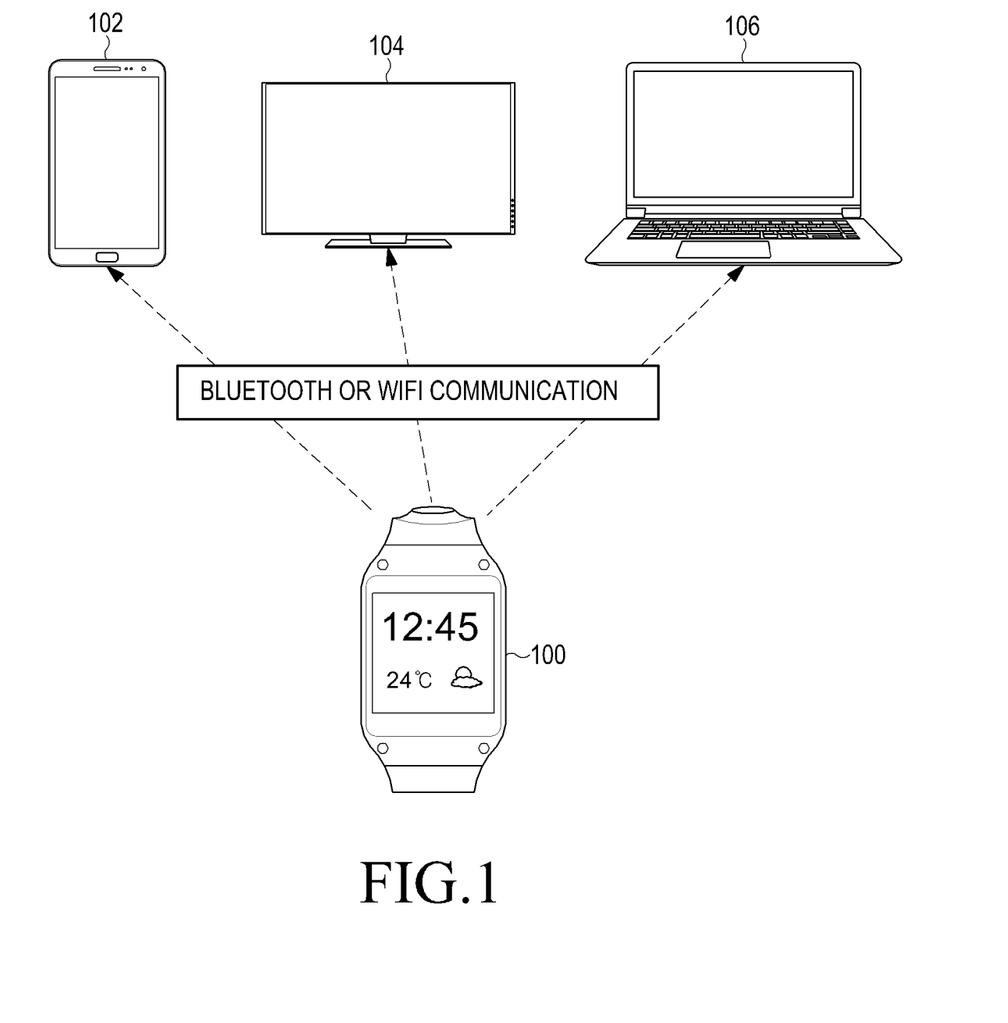
FIG. 1 is a view illustrating a scenario in which login information is provided to at least one user terminal using one portable device according to an embodiment of the present disclosure.

FIG. 1 is a view illustrating a scenario in which login information is provided to at least one user terminal using one portable device according to an embodiment of the present disclosure.

Referring to FIG. 1, when a user logs in to a web service or an application through one or more user terminals 102, 104 and 106, a portable device 100 (e.g., a wearable device of a form such as a watch, glasses, an arm band, etc. which can communicate with the user terminal) provides login information of the user to the user terminal, and thus an auto login may be performed. That is, the portable device 100 may perform a login procedure or an authentication procedure in at least one terminal instead of the user. Therefore, the inconvenience of inputting the password of a user and the effort of password management may be reduced.

At this time, a communication interface, for example, Bluetooth (BT) or WiFi may be used as an interface where the portable device 100 provides the login information to at least one user terminal.

Figure 2:
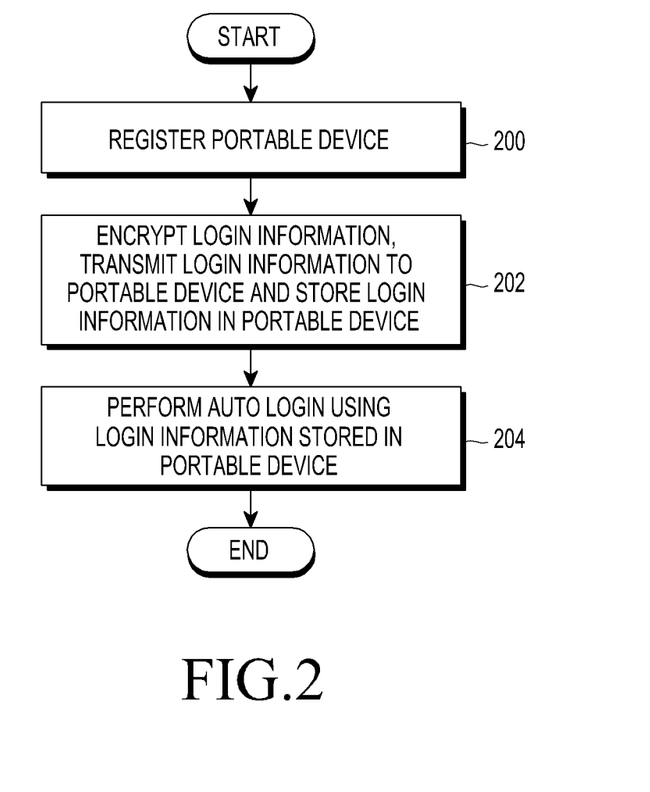
FIG. 2 is a view illustrating an overall procedure in which one portable device is used in order to perform an auto login according to an embodiment of the present disclosure.

FIG. 2 is a view illustrating an overall procedure in which one portable device is used in order to perform an auto login according to an embodiment of the present disclosure.

Referring to FIG. 2, when a user performs a login through a user terminal, the user performs a preliminary procedure in which a portable device to be used is registered to the user terminal at operation 200.

The user terminal transmits the login information used in the login to the registered portable device, and the portable device stores the login information at operation 202. At this time, the login information may be encrypted before the transmitting of the login information, and an encryption key K may be used in encrypting the login information at operation 202.

When the user terminal logs in to the web service, the application, or the like, the user terminal requests a transmission of the login information to the portable device, enables the portable device to input (e.g., transmit) the login information stored therein to the web service or the application, and thus an auto login is performed at operation 204. That is, when the user logs in to the web service or the application through the user terminal, the user may input (e.g., transmit) the login information with support of the portable device without a recall and a direct input of the login information, and thus the user may conveniently perform the login.

Since a part of each of the operations 200, 202 and 204 described with reference to FIG. 2 may be performed in advance in some cases, all operations need not always be performed, and, in some embodiments, only some parts of the procedures may be performed. For example, when the operation 200 of registering the portable device or the operation 202 of storing the login information is performed in advance, the user terminal may request the login information from the portable device, receive the login information, and perform the login.

Hereinafter, operations between the user terminal and the portable device will be described in more detail.

Figure 3:
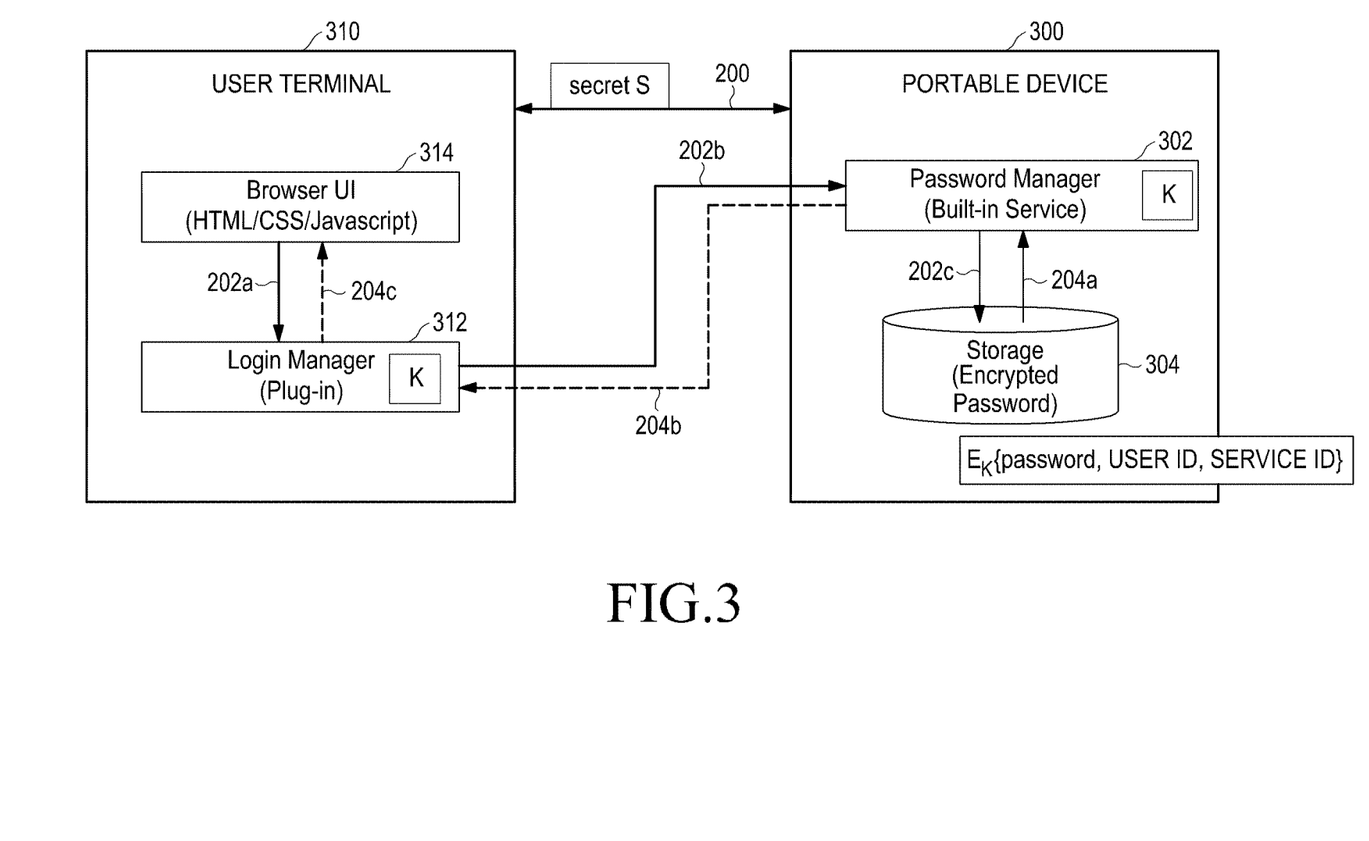
FIG. 3 is a view illustrating a function configuration of a user terminal and a portable device and a login procedure according to an embodiment of the present disclosure.

FIG. 3 is a view illustrating a function configuration of a user terminal and a portable device and a login procedure according to an embodiment of the present disclosure.

Referring to FIG. 3, a portable device 300 includes a password manager 302. The password manager 302 receives encrypted login information from a user terminal 310, and transfers the encrypted login information corresponding to a request from the user terminal 310.

In addition, the portable device 300 may further include a storage unit 304 for storing the login information received from the user terminal 310.

The user terminal 310 includes a login manager 312 which encrypts the login information of the user, transmits the login information to the portable device 300, and requests a transmission of the login information from the portable device 300 as needed. The login manager 312 may perform automatically, communicate with the portable device 300, and perform a retrieval of the login information when a login of a web service and the like is necessary.

In addition, the user terminal 310 may include a browser 314 (e.g., a browser User Interface (UI)) capable of displaying a login input window of the web service. The login manager 312 may decrypt the login information received from the portable device 300, transfer the login information to the browser 314, and input the login information to the login information input window. Selectively, the login manager 312 may be a software module installed in the browser 314 in a plug-in form.

First, a mutual registration procedure 200 between the user terminal 310 and the portable device 300 is described.

Prior to storing the login information in the portable device 300, the portable device 300 should be registered as an effective device in a relation between the portable device 300 and the user terminal 310. Thus, the user terminal 310 registers the portable device 300.

For example, the login manager 312 of the user terminal 310 may register the portable device 300. At this time, the login manager 312 may register the portable device 300 by detecting identification information of the portable device 300 and inputting secret (e.g., secure) information S of the portable device 300 (and transmitting the secret (e.g., secure) information S to the portable device 300). The identification information may be, for example, a BT device ID of the portable device 300 in a case of a BT communication.

For example, the password manager 302 of the portable device 300 may register the user terminal 310. At this time, when the secret (e.g., secure) information received from the user terminal 310 is identical to its own information (e.g., previously stored information), the password manager 302 may determine that the user terminal 310 is an effective (i.e., authorized) counterpart and finish the registration procedure.

Next, a procedure 202 in which the user terminal 310 stores the login information in the portable device 300 is described.

The browser 314 of the user terminal 310 receives the login information, that is, inputs of a user address (e.g., a user ID) and a password of a specific web service from the user, and transfers the login information to the login manager 312 at operation 202a. That is, the login manager 312 receives the login information from the browser 314 at operation 202a.

The login manager 312 of the user terminal 310 transfers the received login information to the portable device 300 (e.g., the password manager 302) at operation 202b. At this time, the login manager 312 transfers a service ID for the specific web service as well as the login information to the portable device 300. Selectively, the login manager 312 may transfer event login URL information of the specific web service to the portable device 300.

The service ID may be a value provided from a server of the web service, or may be an ID generated independently by the login manager 312 (when the server does not notify the service ID). For example, the specific web service may be identified using the login URL information, and the login manager 312 may generate the service ID using the login URL information.

The login manager 312 may further perform at least one of a mutual authentication with the portable device 300 and an encryption of the login information.

The mutual authentication with the portable device 300 may be an operation of re-determining whether the secret information (e.g., secure S) of the portable device 300, which is registered through the preliminary registration procedure, is equal to that of the user terminal 310.

The encryption of the login information includes an encryption of a password among the login information. However, the login manager 312 may encrypt a user ID and a service ID of the login information.

An encryption key K may be used in encrypting the login information. The encryption key may be generated by the login manager 312 of the user terminal 310. Selectively, the encryption key may be transferred to the portable device 300 to be shared with the portable device 300. The encryption key may be configured as a specific value (i.e., a master key) selected by the user, or may be configured as a value inferred from authentication information of the user. When the encryption key is inferred from the user authentication information, the encryption key may be configured as a result value obtained by applying a hash function to any (e.g., a password or a user ID) among pieces of the user authentication information. When all of the user ID, the password, and the service ID are encrypted using the encryption key K, information transferred from the user terminal 310 to the portable device 300 may be expressed as, for example, "$E_k$ {password, user ID, service ID}".

As described above, a mutual secure protocol is established in a path from the user terminal 310 to the portable device 300 by the encryption using the encryption key.

The password manager 302 of the portable device 300 receiving the login information from the user terminal 310 transfers the login information to the storage unit 304 at operation 202c. Thus, the password manager 302 of the portable device 300 stores the login information in the storage unit 304. At this time, the login information may include a user ID, a password, a service ID, etc. The password may be encrypted using an encryption key. Selectively, the information stored in the storage unit 304 may further include login URL information corresponding to the service ID. As described above, the login information of a user is recorded in only the portable device 300 under the management of the user. Accordingly, there is no possibility of a leakage of personal information in a case of a hacking. Thus, it is very secure.

Next, a procedure 204 of extracting (e.g., retrieving) the login information and inputting (e.g., transmitting) the login information to the web service or the application in response to the request of the user terminal 310 by the portable device 300 is described.

The portable device 300 is requested to input (e.g., transmit) the login information to a specific web service from the user terminal 310. The request may include a service ID corresponding to the specific web service. The password manager 302 of the portable device 300 receiving the request of the input (e.g., transmission) of the login information extracts the login information from the storage unit 304 using the service ID at operation 204a. The login information extracted at this time may include a user ID, a password, etc., and may further include at least one of the service ID and the login URL information.

The password manager 302 may transfer the login information extracted using one of two embodiments to the server of the web service or the server of the application (hereinafter, referred to a 'web server').

A first embodiment is a method in which the password manager 302 transfers the login information to the user terminal 310 requesting the login information at operation 204b. The login information transferred to the login manager 312 of the user terminal 310 may include the user ID and the password. However, since the user terminal 310 already knows the service ID and the login URL information, the service ID and the login URL information may not be included in the login information. The login manager 312 may transfer the received login information to the browser 314 at operation 204c to transfer the login information to the web server.

A second embodiment is a method in which the password manager 302 does not transfer the login information to the user terminal 310 but directly transfers the login information to the web server. That is, the portable device 300 may include a separate communication means (e.g., a cellular communication modem), and may transmit the login information to the web server indicated by the login URL information using a communication protocol (e.g., a security protocol such as hypertext transfer protocol secure (HTTPS)).

At this time, the login information directly transferred to the web server by the password manager 302 may include the user ID and the password. Thus, the password manager 302 may further decrypt the encrypted login information before transmitting the login information to the web server. The password manager 302 uses the encryption key K in decrypting the login information (including at least a password). The encryption key K may be a value received from the user terminal 310, or may be a value independently generated by a random regulation shared with the user terminal 310.

The two embodiments will be described in more detail with reference to the drawings.

Figure 4:
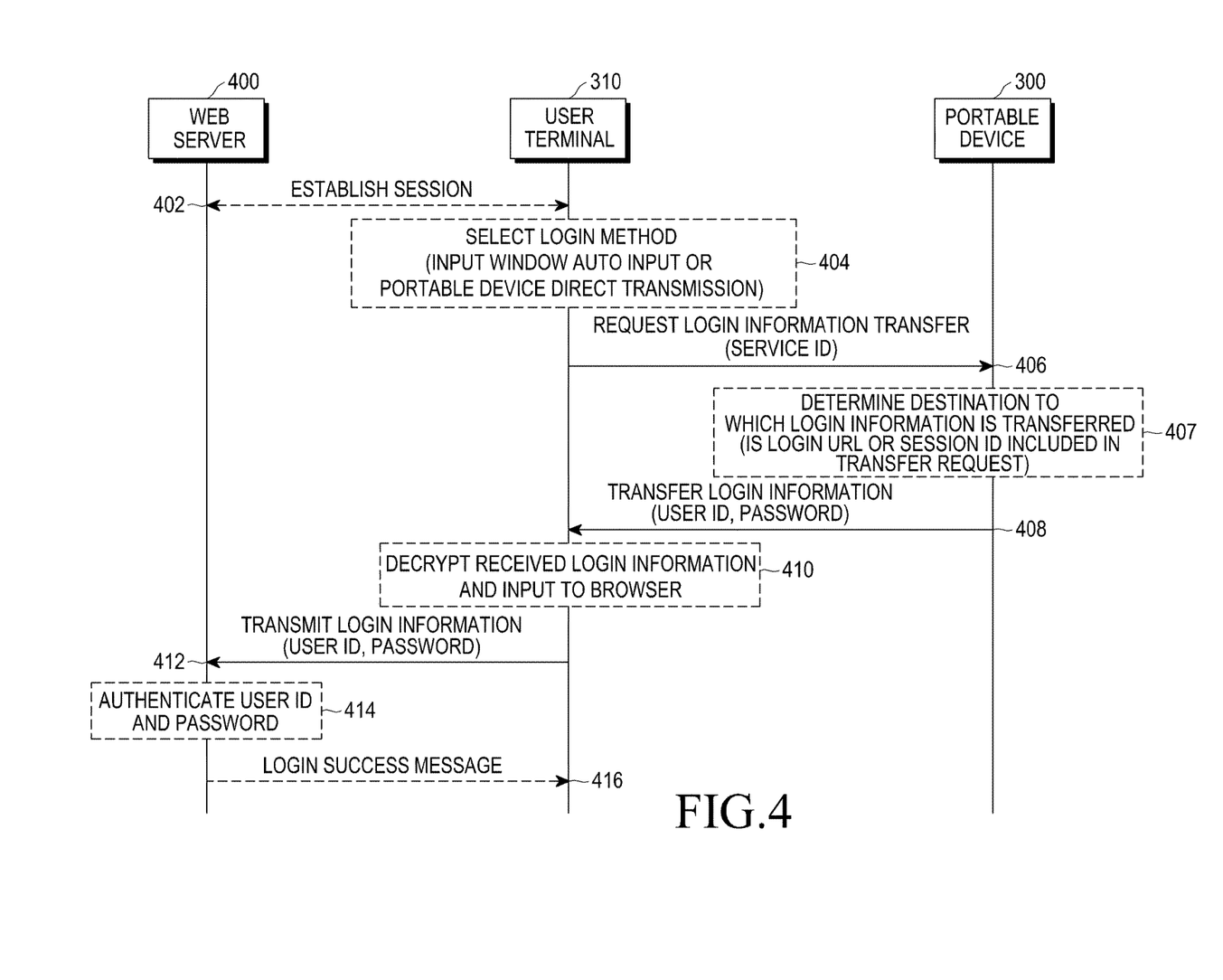
FIG. 4 is a view illustrating a procedure in which login information is transferred to a web server according to an embodiment of the present disclosure.

FIG. 4 is a view illustrating a procedure in which login information is transferred to a web server according to an embodiment of the present disclosure.

Referring to FIG. 4, when a user opens a login page to access a web service in a user terminal, the user terminal 310 establishes a communication session with a web server 400 at operation 402.

The user or the user terminal 310 may determine (e.g., select) any type of auto login performed thereby at operation 404. For example, the user or the user terminal 310 may determine one of a method (i.e., an input window auto input method) in which the user terminal 310 receives the login information from the portable device 300 and transfers the login information to the web server 400 and a method (i.e., a portable device direct transmission method) in which the portable device 300 directly transfers the login information to the web server 400 as the auto login method.

At this time, the user terminal 310 may further perform at least one among an operation of identifying whether the portable device 300 for the performance of the auto login exists, an operation of selecting a specific portable device when a plurality of the portable devices exist, and an operation of detecting the registering of a new portable device. In the described embodiment, it is assumed that one registered portable device 300 is already selected for performing the auto login.

The two operations 402 and 404 need not be performed according to the various embodiments (e.g., when a form of a session in advance is not required or when a login is performed according to a method determined by a default).

When the input window input method is selected, the user terminal 310 requests the transfer of the login information from the portable device 300 at operation 406. At this time, the request may include a service ID of the login information to be transferred.

Selectively, the portable device 300 may further determine at operation 407 a destination where the extracted login information is transferred, according to an inclusion of the login URL information or the session ID to the request message. For example, when the request message does not include the login URL information or the session ID, the portable device 300 may determine to transfer the login information to the user terminal 310 (rather than the web server 400).

The portable device 300 receiving the request for login information transmission extracts the login information using the service ID, and transfers the extracted login information to the user terminal 310 at operation 408.

The user terminal 310 receiving the login information may decrypt the login information using the encryption key K and input the decrypted login information to an input window (e.g., a browser UI) requesting an input of the login information at operation 410. At this time, the operation 410 of inputting the login information to the input window may be omitted because it is a process for a visible check of the user.

The user terminal 310 transmits the decrypted login information (i.e., the user ID and the password) to the web server 400 using a browser at operation 412.

The web server 400 receiving the login information verifies the effectiveness of the user ID and the password at operation 414. The web server 400 may further transmit a login success message to the user terminal 310 according to a result of the verification at operation 416.

Figure 5:
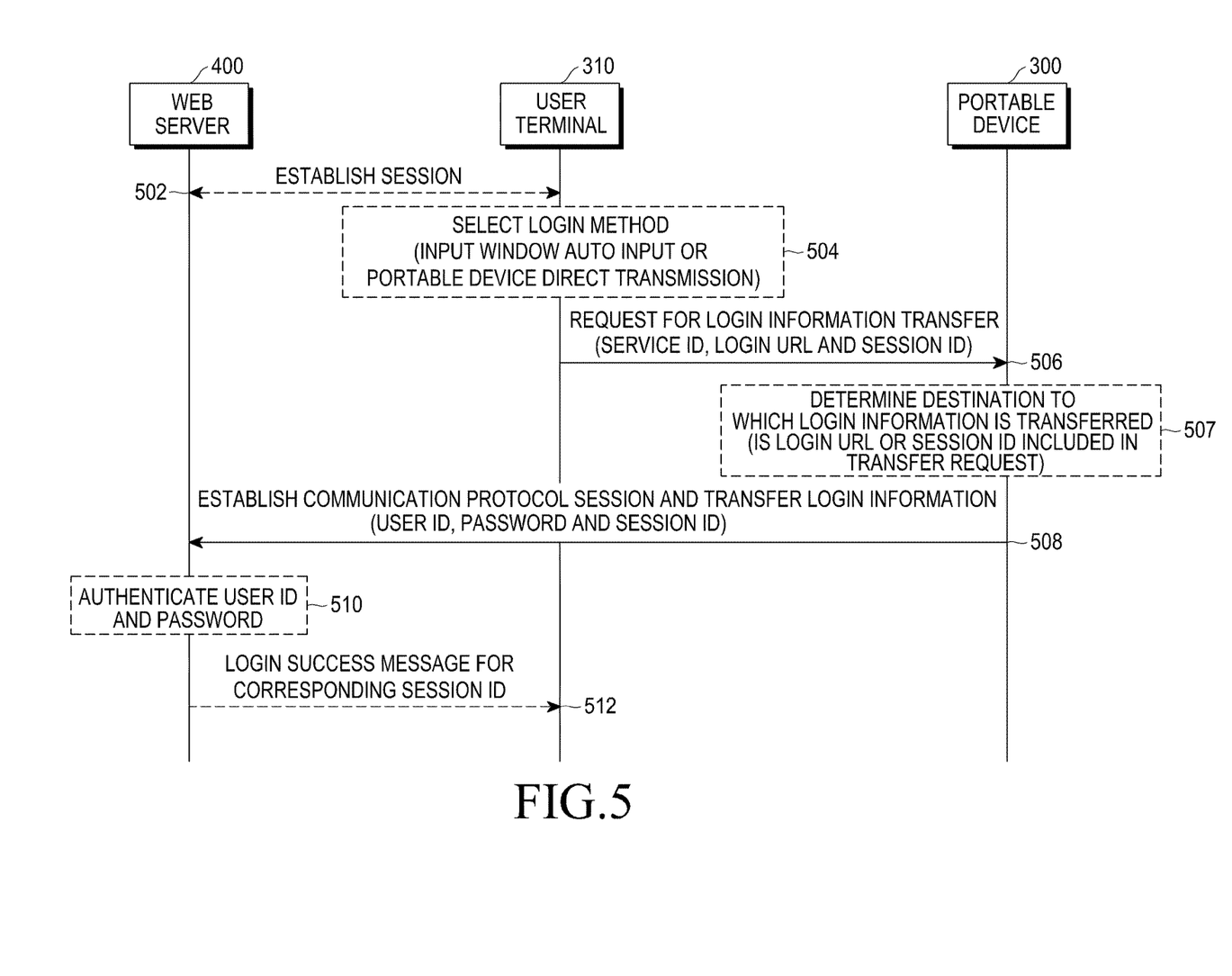
FIG. 5 is a view illustrating a procedure in which login information is transferred to a web server according to an embodiment of the present disclosure.

FIG. 5 is a view illustrating a procedure in which login information is transferred to a web server according to an embodiment of the present disclosure.

Referring to FIG. 5, when a user opens a login page to access a web service in a user terminal, the user terminal 310 establishes a communication session with the web server 400 at operation 502.

The user or the user terminal 310 may determine (e.g., select) any type of auto login performed thereby at operation 504. For example, the user or the user terminal 310 may determine one of the method (i.e., the input window auto input method) in which the user terminal 310 receives the login information from the portable device 300 and transfers the login information to the web server 400 and the method (i.e., the portable device direct transmission method) in which the portable device 300 directly transfers the login information to the web server 400 as the auto login method.

At this time, the user terminal 310 may further perform at least one among an operation of identifying whether the portable device 300 for the performance of the auto login exists, an operation of selecting a specific portable device when a plurality of the portable devices exists, and an operation of detecting for registering a new portable device. In the described embodiment, it is assumed that one registered portable device 300 is already selected for performing the auto login.

The two operations 502 and 504 need not be performed according to various embodiments (e.g., when a form of a session in advance is not required or when a login is performed according to a method determined by a default).

When the portable device direct transmission method is determined, the user terminal 310 requests the transmission of the login information from the portable device 300 at operation 506. At this time, the request may include a service ID of the login information to be transferred.

Selectively, the portable device 300 may further determine at operation 507 a destination where the extracted login information is transferred, according to inclusion of the login URL information or the session ID in the transmission request message. For example, when the transmission request message includes the login URL information or the session ID, the portable device 300 may transfer the login information to the web server (rather than the user terminal 310).

The portable device 300 receiving the request of the login information transmission extracts the login information using the service ID, decrypts the extracted login information, and transfers the extracted login information to the web server 400 at operation 508. At this time, the portable device 300 may decrypt the extracted login information using the encryption key K. In addition, the portable device 300 may establish a communication protocol (e.g., a security protocol such as HTTPS) session with the web server 400 using the login URL information and transmit the login information through the established session. The login information transmitted to the web server 400 may include the user ID and the password, and may further include the session ID.

The web server 400 receiving the login information verifies effectiveness of the user ID and the password at operation 510. The web server 400 may further transmit a login success message to the user terminal 310 according to a result of the verification at operation 512. At this time, the web server 400 may identify the user terminal 310 which establishes at operation 502 the session and attempts the login by using the session ID transferred from the portable device 300. That is, the web server 400 may transmit the login success message to the user terminal 310 indicated through the session ID.

Figure 6:
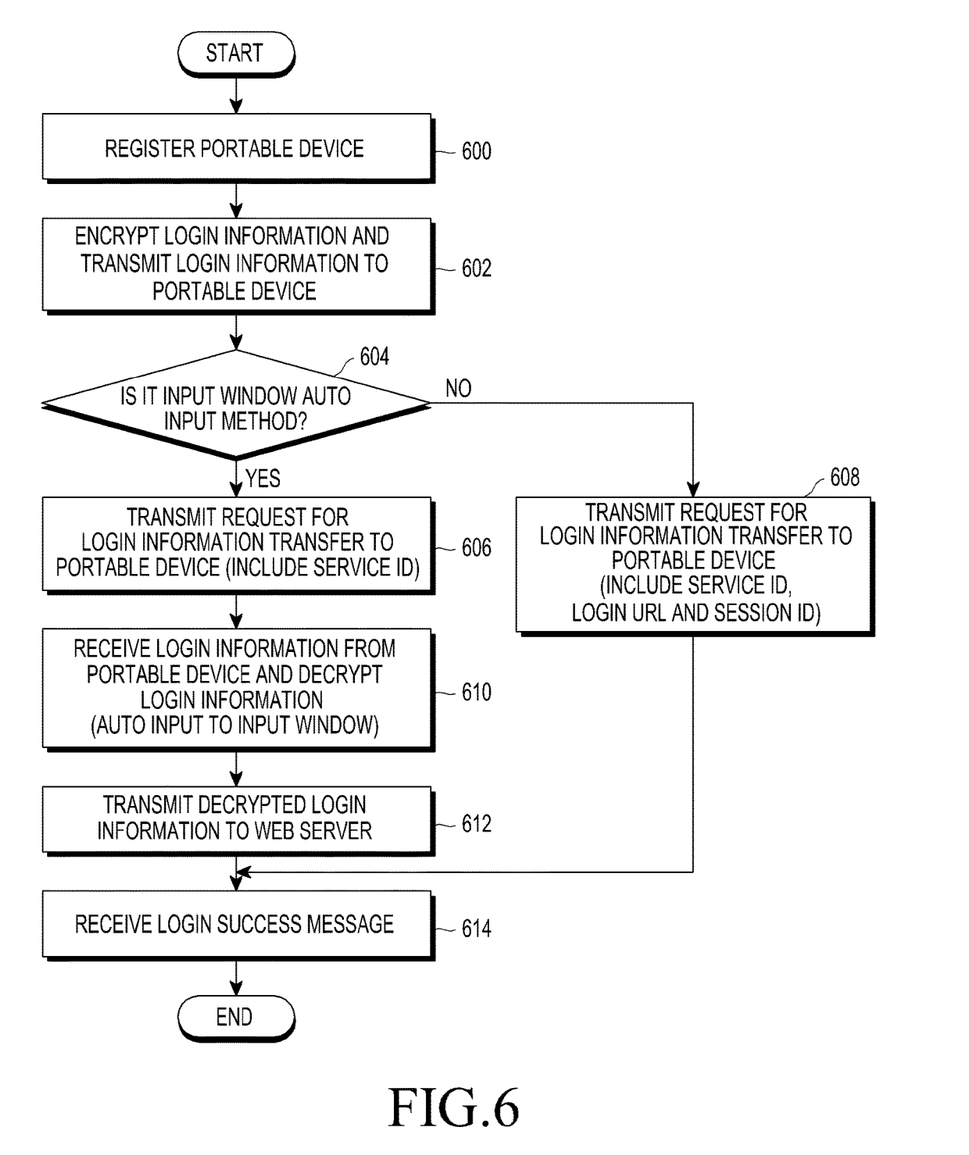
FIG. 6 is a view illustrating a method of supporting a login of a user terminal according to various embodiments of the present disclosure.

FIG. 6 is a view illustrating a method of supporting a login of a user terminal according to various embodiments of the present disclosure.

Referring to FIG. 6, the user terminal 310 may register the portable device 300 to be used in performing the auto login at operation 600. The user terminal 310 may detect identification information of the portable device 300, verify effectiveness by inputting the secret (e.g., secure) information S of the portable device 300 (or transmitting the secret (e.g., secure) information S of the portable device 300 to the portable device 300), and register the portable device 300. Since the process 600 of registering the portable device is an arrangement operation, the process 600 of registering the portable device is not an operation that must be performed in all cases, and may be performed at other times (e.g., after selecting the auto login method at operation 604) according to various embodiments.

The user terminal 310 may encrypt the login information of a web service that the user terminal 310 tries to access, using the encryption key K, and may transfer the login information to the portable device 300 at operation 602. Since the transferring of the login information to the portable device 300 at operation 602 is an arrangement operation, the transferring of the login information to the portable device 300 at operation 602 is not always performed in all cases.

The user terminal 310 may determine any of various login methods according to two embodiments at operation 604. For example, the user terminal 310 may determine the method (i.e., the input window auto input method) in which the user terminal 310 receives the login from the portable device 300 and transfers the login information to the web server 400 or the method in which the portable device 300 directly transfers the login information to the web server 400. However, when the user terminal 310 is configured to select only one method, the determining operation 604 need not be performed. That is, only one method may be performed without the determining operation 604.

When the input window auto input method is selected (i.e., the case of the first embodiment), the user terminal 310 transmits a transmission request (i.e., a login information transmission request) including the service ID to the portable device 300 at operation 606. The user terminal 310 receives the login information from the portable device 300 in response to the transmission request, decrypts the received login information, and inputs the login information to the login information input window of a browser UI at operation 610. Meanwhile, since the operation of inputting the login information to the login information input window is for displaying a process of an operation to the user, the operation of inputting the login information to the login information input window need not be performed. In addition, the user terminal 310 may transfer the decrypted login information to the web server 400 at operation 612. In addition, the user terminal 310 may further receive the login success message from the web server 400 at operation 614.

When the portable device transmission method is selected (i.e., the case of the second embodiment), the user terminal 310 transmits the transmission request (i.e., the login information transmission request) including the service ID, the login URL information and the session ID to the portable device 300 at operation 608. In addition, the user terminal 310 may further receive the login success message from the web server 400 at operation 614. The session ID is transferred to the web server 400 through the portable device 300, since the session ID is a session already established between the user terminal 310 and the web server 400, the user terminal 310 may receive the login success message from the web server 400 through the session ID at operation 614.

Figure 7:
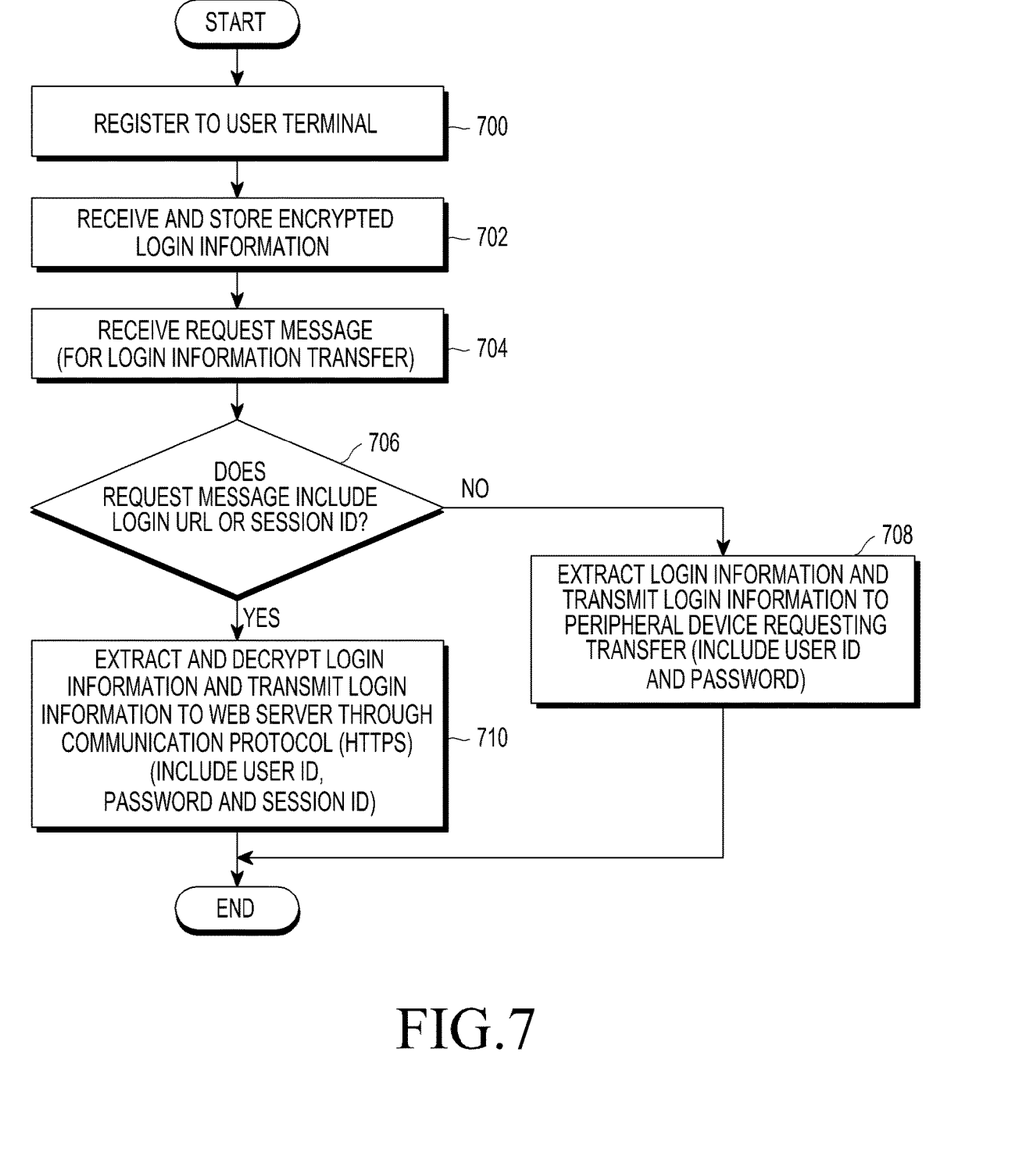
FIG. 7 is a view illustrating a method of supporting a login of a portable device according to various embodiments of the present disclosure.

FIG. 7 is a view illustrating a method of supporting a login of a portable device according to various embodiments of the present disclosure.

Referring to FIG. 7, the portable device 300 may perform a mutual registration process with the user terminal 310 at operation 700. The portable device 300 may determine effectiveness of the user terminal 310 by identifying whether secret (e.g., secure) information S received from the user terminal 310 is equal to secret information thereof. Since the mutual registration process 700 with the user terminal 310 is an arrangement operation, the mutual registration process 700 with the user terminal 310 is not an operation that must always be performed in all cases, and may be performed at another (e.g., random) time according to various embodiments.

The portable device 300 may receive the encrypted login information of the web service from the user terminal 310 at operation 702. Since the receiving of the login information from the user terminal 310 is an arrangement operation, the receiving of the login information from the user terminal 310 need not always be performed in all cases.

The portable device 300 receives a transmission request message requesting the transmission of the login information from the user terminal 310 at operation 704.

The portable device 300 may determine a destination where the login information is transferred by identifying whether the received transmission request message includes only the service ID or includes even the login URL information or the session ID at operation 706. For example, when the transmission request message includes only the service ID, the destination may be determined as the user terminal 310. When the transmission request message includes even the login URL information or the session ID, the destination may be determined to be the web server 400 indicated by the login URL information.

When the destination is determined to be the user terminal 310 (that is, when the transmission request message does not include the login URL information or the session ID), the portable device 300 may extract the login information and transmit the login information to the user terminal 310 at operation 708.

When the destination is determined to be the web server 400 (that is, when the transmission request message includes the login URL information or the session ID), the portable device 300 may extract and decrypt the login information, establish a communication protocol (e.g., a security protocol such as HTTPS) with the web server 400, and transmit the decrypted login information to the web server 400 at operation 710. At this time, the information transmitted to the web server 400 may further include the session ID received from the user terminal 310.

It should be noted that the system architecture diagram, the apparatus structure diagram, and the login procedure flowchart illustrated in FIGS. 1 to 7 are not intended to limit the scope of protection of the present disclosure. That is, all configurations of the operations illustrated in FIGS. 1 to 7 should not be interpreted as essentially structural elements for carrying out the present disclosure, and variations and modifications of the present disclosure may be implemented without departing from the scope of the present disclosure.

The above-described operations may be implemented by including a memory device, in which the corresponding program code is stored, in any constituent unit in user equipment, mobile equipment, or a web server apparatus. That is, the user equipment, mobile equipment, or web server apparatus may carry out the above-described operations by reading and executing the program code stored in the memory device using a processor or a central processing unit (CPU).

The various components of the smart module, device and the like used in the specification may operate by using a hardware circuit, for example, a combination of a complementary metal oxide semiconductor based logical circuit, firmware, software and/or hardware, and a combination of firmware and/or software inserted into a machine-readable medium. As an example, various electric configurations and methods may be carried out by using electric circuits such as transistors, logic gates, and an application specific integrated circuit (ASIC).

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of supporting a login for a web service in a user terminal using a portable device, the method comprising:
    registering the portable device through a wireless communication with the portable device;
    encrypting login information for at least one web service and transmitting the login information to the registered portable device;
    establishing a communication session with a server of the web service;
    determining whether the portable device directly transfers the login information to the server of the web service; and
    transmitting a request message requesting a transmission of the login information of the web service to the portable device,
    wherein the request message includes a service identification (ID) identifying the web service if the portable device is determined to transfer the login information to the user terminal, and
    wherein the request message includes the service ID identifying the web service, login uniform resource locator (URL) information of the web service, and a session ID of the established session if the portable device is determined to directly transfer the login information to the server of the web service.

2. The method of claim 1, further comprising:
    receiving login information corresponding to the service ID in response to the request message.

3. The method of claim 2, further comprising:
    decrypting the received login information; and
    transmitting the decrypted login information to the server of the web service.

4. The method of claim 3, wherein the transmitting the decrypted login information to the server of the web service comprises:
    inputting the decrypted login information to a login information input window of a browser; and
    transmitting the login information input to the login information input window to the server of the web service.

5. The method of claim 1, further comprising:
    receiving a login success message from the server of the web service.

6. The method of claim 1, wherein the login information is encrypted by an encryption key, the encryption key is configured as one of a value obtained by applying a hash function to the login information and a random value determined by a user, and the encryption key is shared with the portable device.

7. A method of supporting a login in a portable device which supports a web service login of a user terminal, the method comprising:
    registering to the user terminal through a wireless communication with the user terminal;
    receiving login information for at least one web service from the user terminal and storing the login information;
    receiving a request message requesting a transmission of the login information of the web service from the user terminal, the request message including a service identification (ID) identifying the web service;
    determining whether the received request message further includes login uniform resource locator (URL) information of the web service, and a session ID of a session established with a server of the web service;
    transmitting the login information of the web service to the user terminal if the login URL information and the session ID is not included in the received request message; and
    transmitting the login information of the web service to the server of the web service directed by the login URL information if the login URL information and the session ID is included in the received request message.

8. The method of claim 7, wherein the login information transmitted to the server of the web service includes a user ID, a password and the received session ID.

9. The method of claim 7, further comprising, before transmitting the login information:
extracting the login information of the web service; and
decrypting the extracted login information.

10. The method of claim 7, wherein the login information is decrypted by an encryption key, the encryption key is configured as one of a value obtained by applying a hash function to the login information and a random value determined by a user, and the encryption key is shared with the user terminal.

11. The method of claim 7, wherein the portable device comprises one of a watch, glasses or an arm band.

12. A user terminal for supporting a login for a web service using a portable device, the user terminal comprising:
a processor configured to:
register the portable device through a wireless communication with the portable device,
encrypt login information for at least one web service,
transmit the login information to the registered portable device,
establish a communication session with a server of the web service,
determine whether the portable device directly transfers the login information to the server of the web service, and
transmit a request message requesting a transmission of the login information of the web service to the portable device,
wherein the request message includes a service identification (ID) identifying the web service if the portable device is determined to transfer the login information to the user terminal, and
wherein the request message includes the service ID identifying the web service, login uniform resource locator (URL) information of the web service, and a session ID of the established session if the portable device is determined to directly transfer the login information to the server of the web service.

13. The user terminal of claim 12, wherein the processor is further configured to receive login information corresponding to the service ID in response to the request message.

14. The user terminal of claim 13, wherein the processor is further configured to:
decrypt the received login information, and
transmit the decrypted login information to the server of the web service.

15. The user terminal of claim 14, wherein the processor is further configured to:
input the decrypted login information to a login information input window of a browser, and
transmit the login information input to the login information input window to the server of the web service.

16. The user terminal of claim 12, wherein the processor is further configured to receive a login success message from the server of the web service.

17. The user terminal of claim 12, wherein the login information is encrypted by an encryption key, the encryption key is configured as one of a value obtained by applying a hash function to the login information and a random value determined by a user, and the encryption key is shared with the portable device.

18. A portable device for supporting a login for a web service of a user terminal, the portable device comprising:
a processor configured to:
register to the user terminal through a wireless communication with the user terminal,
receive login information for at least one web service from the user terminal,
store the login information in a storage unit,
receive a request message requesting a transmission of the login information of the web service from the user terminal, the request message including a service identification (ID) identifying the web service,
determine whether the received request message further includes login uniform resource locator (URL) information of the web service, and a session ID of a session established with a server of the web service,
transmit the login information of the web service to the user terminal if the login URL information and the session ID is not included in the received request message, and
transmit the login information of the web service to the server of the web service directed by the login URL information if the login URL information and the session ID is included in the received request message,
wherein the storage unit is configured to store the login information received from the user terminal.

19. The portable device of claim 18, wherein the login information transmitted to the server of the web service includes a user ID, a password and the received session ID.

20. The portable device of claim 18, wherein the processor is further configured to extract the login information of the web service and decrypt the extracted login information.

21. The portable device of claim 18, wherein the login information is decrypted by an encryption key, the encryption key is configured as one of a value obtained by applying a hash function to the login information and a random value determined by a user, and the encryption key is shared with the user terminal.

22. The portable device of claim 18, wherein the portable device comprises one of a watch, glasses, or an arm band.

* * * * *